(12) United States Patent
Reese et al.

(10) Patent No.: US 6,226,274 B1
(45) Date of Patent: May 1, 2001

(54) METHOD AND APPARATUS FOR MULTIPLE ACCESS COMMUNICATION

(75) Inventors: Timothy L. Reese; Scott R. Unger, both of Colorado Springs, CO (US)

(73) Assignee: Omnipoint Corporation, Bethesda, MD (US)

( * ) Notice: Subject to any disclaimer, the term of this patent is extended or adjusted under 35 U.S.C. 154(b) by 0 days.

(21) Appl. No.: 09/160,010

(22) Filed: Sep. 24, 1998

(51) Int. Cl.[7] .......................................................... H04J 3/00
(52) U.S. Cl. .......................................... 370/280; 370/281
(58) Field of Search ..................................... 370/276, 277, 370/278, 280, 281, 282, 307, 321, 347, 507, 319, 431, 337; 455/51.1

(56) References Cited

U.S. PATENT DOCUMENTS

| | | | |
|---|---|---|---|
| 4,803,681 | 2/1989 | Takahashi | 370/85 |
| 5,090,013 | 2/1992 | Fadem | 370/85.8 |
| 5,446,739 | * 8/1995 | Nakano et al. | 370/95.3 |
| 5,732,076 | * 3/1998 | Ketseoglou et al. | 370/347 |
| 5,805,581 | 9/1998 | Uchida et al. | 370/35 |
| 5,959,980 | * 9/1999 | Scott | 370/280 |

* cited by examiner

Primary Examiner—Chau Nguyen
Assistant Examiner—Alexander Boakye

(74) Attorney, Agent, or Firm—Lyon & Lyon LLP

(57) ABSTRACT

A communication system and method requiring minimal adaptation of TDD equipment to support an FDD frame structure, includes a novel frame structure by which a plurality of user stations, each having a single frequency synthesizer, communicate with a base station. According to the frame structure, a time frame comprises a plurality of time slots each divided into a first time segment and a second time segment. Transmissions from user stations are sent over the user transmission frequency band, and alternate in time with transmissions from the base station sent over the base transmission frequency band in a manner to provide adequate transmit/receive switching time for the user stations. The user stations preferably transmit to the base station in the first time segment of a time slot, and the base station preferably transmits in the second time segment of a time slot, such that the base station and user stations do not transmit simultaneously. In one embodiment, a duplex communication includes a user station transmission and a base station transmission in adjacent time slots. In an alternative embodiment, a duplex communication includes a user station transmission separated by approximately one-half the time frame from the base station transmission. User stations and/or base stations originally configured for TDD communication can be adapted or modified to support the various FDD frame structures of the present invention with minimal reconfiguration to the software and/or hardware.

10 Claims, 10 Drawing Sheets

METHOD AND APPARATUS FOR MULTIPLE ACCESS COMMUNICATION

BACKGROUND OF THE INVENTION

1) Field of the Invention

The field of the present invention relates to methods and apparatus for multiple access communication.

2) Background

A variety of techniques are known for allowing multiple users to communicate wirelessly with one or more fixed stations (i.e., base stations) by making use of shared communication resources. Examples of multiple-access communication systems include cellular telephone networks and local wireless communication systems, such as wireless private branch exchange (PBX) networks. In such multiple-access communication systems, transmissions from different sources may be distinguished in a variety of manners, such as on the basis of different frequencies, time slots, and/or codes, for example.

As referred to herein, a communication system in which transmissions are distinguished according to the transmission frequency may be referred to as a frequency division multiple access (FDMA) communication system. A communication system in which a forward link transmission over one frequency is paired with a reverse link transmission over a different frequency may be referred to as a frequency division duplex (FDD) communication system.

A communication system in which transmissions are distinguished according to the relative timing of the transmission (i.e., by use of time slots) may be referred to as a time division multiple access (TDMA) communication system. A communication system in which a forward link transmission during one time slot (or time segment) is paired with a reverse link transmission occurring during a different time slot (or time segment) may be referred to as a time division duplex (TDD) communication system. The DECT system is an example of a well known type of TDD communication system.

A communication system in which transmissions are distinguished according to which code is used to encode the transmission may be referred to as a code division multiple access (CDMA) communication system. In a CDMA communication system, the data to be transmitted is generally encoded in some fashion, in a manner which causes the signal to be "spread" over a broader frequency range and also typically causes the signal power to decrease as the frequency bandwidth is spread. At the receiver, the signal is decoded, which causes it to be "despread" and allows the original data to be recovered. Distinct codes can be used to distinguish transmissions, thereby allowing multiple simultaneous communication, albeit over a broader frequency band and generally at a lower power level than "narrowband" FDMA or TDMA systems. Different users may thereby transmit simultaneously over the same frequency without necessarily interfering with one another.

Various "hybrid" communication systems incorporating aspects of more than one multiple access communication technique have been developed or proposed. For example, a GSM system may be viewed as a "hybrid" communication system utilizing aspects of both FDD and TDMA. In a GSM system, each base station is assigned a transmission frequency band and reception frequency band. The base station transmits to each of its mobile stations using a transmission frequency within its assigned frequency band, and the mobile stations transmit to the base station using a frequency within the base station's reception frequency band. The transmissions to the user stations are sent in assigned time slots over the base station's transmission frequency, and the transmissions from the user stations are sent in corresponding assigned time slots over the base station's reception frequency.

FIG. 3 is a diagram showing an over-the-air frame structure 301, commonly associated with a conventional GSM system. As shown in FIG. 3, a base transmission time frame 302 is defined with respect to a base station transmission frequency 311, and a mobile station transmission time frame 303 is defined with respect to a mobile station transmission frequency 312. The base station transmission frequency 311 and mobile station transmission frequency 312 are separated by a predefined frequency separation (e.g., 45 MHz). The base transmission time frame 302 comprises a number of base transmission time slots 306 of equal duration Likewise, the mobile transmission time frame 303 comprises a number of mobile transmission time slots 307 of equal duration. Both the base transmission time frame 302 and the mobile transmission time frame 303 have the same number of time slots 306, 307, such as eight time slots 306, 307 apiece.

In operation, a GSM base station transmits during the base transmission time slots 306 and receives during the mobile transmission time slots 307. The mobile transmission time frame 303 is "offset" by a predefined duration 305 (e.g., three time slots) from the base transmission time frame 302, so as to allow the mobile stations a sufficient "turn-around" switching time and information processing time, and also to allow propagation of the base-to-mobile messages to the mobile stations.

While multiple access communication may be achieved using techniques of either FDMA, TDMA or CDMA, or certain variations (e.g., FDD or TDD) or combinations thereof, problems can occur if an equipment manufacturer or operator desires to migrate from one type of multiple access communication to a different type. This problem results from the fact that equipment manufactured specifically for any one type of multiple access communication system typically cannot be used with another ye of multiple access system because of inherent differences in the nature of the communication techniques, leading to incompatibilities between the physical hardware as well as the communication protocols employed by the two communication systems. For example, a base station designed for TDD communication cannot be expected to communicate properly with an FDD handset, nor can it be expected that a TDD handset will communicate properly with a base station designed for FDD communication.

It may nevertheless be desired by equipment manufacturers or service providers to deploy or offer systems using different multiple access communication techniques or protocols, in order to serve different markets, geographical regions, or clientele, or for other reasons. However, to develop separate equipment for operation in different multiple access communication environments can substantially increase equipment design and manufacturing costs. Such a development process can also lead to the creation of different and incompatible protocols, which can require, for example, different types of backhaul service, leading to greater design expense to support the different backhaul formats and possibly duplicative base station controllers in the same local area, each servicing a different type of base station (i.e., FDD vs. TDD). Furthermore, an equipment manufacturer or service provider may desire to migrate from one type of multiple access communication and protocol to another type, without incurring substantial redesign costs.

It would therefore be advantageous to provide an apparatus and method allowing communication in more than one multiple access communication environment. It would further be advantageous to provide a method and apparatus for converting or adapting equipment from one type of multiple access communication service (e.g., TDD) to a different type (e.g., FDD).

SUMMARY OF THE INVENTION

The invention provides in one aspect a communication system including a method and apparatus for performing FDD communication which, among other things, requires minimal adaptation of TDD equipment to support an FDD frame structure.

In one embodiment, a novel frame structure is provided by which a plurality of user stations, each having a single frequency synthesizer, are capable of communicating with a base station over two frequency bands so as to perform FDD communication. According to this embodiment, a time frame comprises a plurality of base transmit time slots with respect to a base transmission frequency band, and a plurality of user transmit time slots with respect to a user transmission frequency band. The base transmit time slots and user transmit time slots are each divided into a first time segment and a second time segment, each of which preferably comprises one-half of the time slot. Transmissions from user stations sent over the user transmission frequency band alternate in time with transmissions from the base station sent over the base transmission frequency band. The user stations transmit to the base station in the first time segment of a time slot, and the base station transmits in the second time segment of a time slot, such that the base station and user stations preferably do not transmit simultaneously.

At least two different time frame structures employing the inventive principles are disclosed. In one embodiment, the base station communicates with each of a plurality of user stations in sequence, and completes an entire duplex exchange with a given user station before communicating with the next user station. In a preferred version of this embodiment, "active" base transmit time slots are alternated in time sequence with "active" user transmit time slots. Within the base transmit time slots, the first time segment is designated null and void (i.e., unused), and within the user transmit time slots the second time segment is likewise designated null and void. The user stations therefore transmit in the first time segment of every other user transmit time slot, and the base station transmits in the second time segment of every other base transmit time slot. A transmit/receive switching time period is defined by the aggregation of the second time segment of an active user transmit time slot and the first time segment of an active base transmit time slot. During the transmit/receive switching time period, the user station currently engaged in communication with the base station switches its radio between the user transmit frequency and the base transmit frequency, and enters a reception mode.

In another embodiment, the base station communicates with each of a plurality of user stations in sequence, but does not complete an entire duplex exchange with a given user station before communicating with the next user station. In a preferred version of this embodiment, a time frame again comprises a plurality of base transmit time slots with respect to a base transmission frequency band, and a plurality of user transmit time slots with respect to a user transmission frequency band, with the base transmit time slots and user transmit time slots divided into a first time segment and a second time segment of preferably equal durations. The base station transmissions preferably alternate in time with the user station transmissions. The user stations transmit in the first time segment of the user transmit time slots, and the base station transmits in the second time segment of the base transmit time slots, such that the base station and user stations do not transmit simultaneously. Duplex communication channels are defined such that the base station transmissions are separated in time by a prescribed time period from the corresponding user station transmissions in each duplex communication channel. A duplex pairing of transmissions thereby comprises a base station transmission on a base time slot separated in time by a prescribed time period (e.g., approximately one-half of the time frame) from the corresponding user station transmission on the user time slot, with the intervening time period allowing transmit/receive switching by the user station.

In another aspect, a user station originally configured for TDD communication and having a single frequency synthesizer is adapted or modified to perform FDD communication, preferably in accordance with a preferred FDD time frame structure as disclosed herein. Such adaptations or modifications may include, among other things, provision for re-tuning the frequency synthesizer of the user station at appropriate intervals to allow for FDD communication, and re-configuration of the voice/data processing interface to account for the delay necessary for transmit/receive switching times.

In another aspect, a base station originally configured for TDD communication and having a single frequency synthesizer is adapted or modified to perform FDD communication, preferably in accordance with a preferred FDD time frame structure as disclosed herein. Such adaptations or modifications may include, among other things, provision for re-tuning the frequency synthesizer of the base station at appropriate intervals to allow for FDD communication, and re-configuration of the backhaul interface to account for the delays necessary for transmit/receive switching times.

In another aspect, a base station originally configured for TDD communication and having a multiple frequency synthesizers is adapted or modified to perform FDD communication, preferably in accordance with a preferred FDD time frame structure as disclosed herein. Such adaptations or modifications may include, among other things, reconfiguration of the backhaul interface to account for separation of the base and user station transmissions and the delays necessary for user station transmit/receive switching times.

Further embodiments, modifications, variations and enhancements of the invention are also disclosed herein.

DETAILED DESCRIPTION OF PREFERRED EMBODIMENTS

Figure 1:
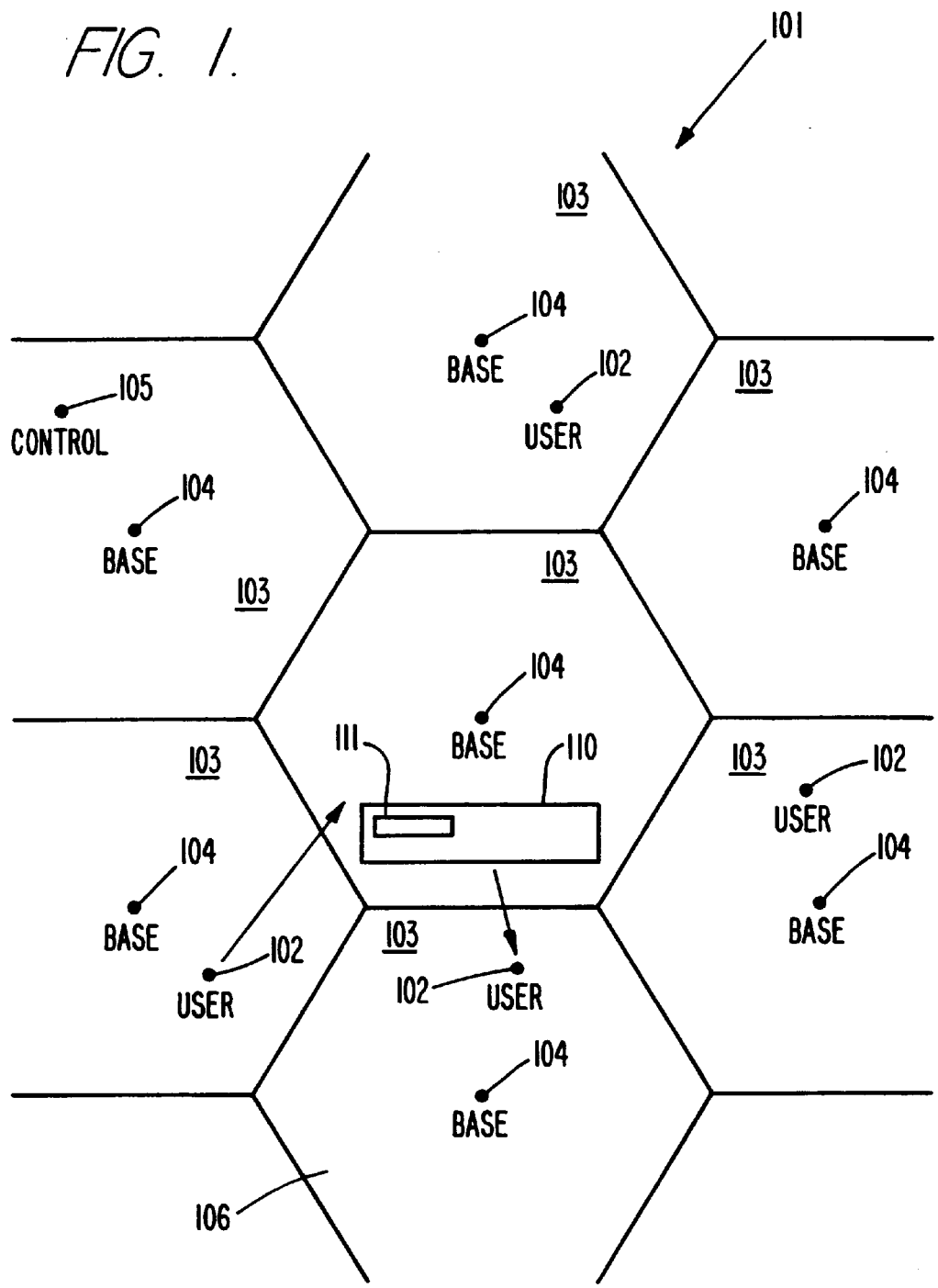
FIG. 1 is a diagram of a cellular system.

FIG. 1 is a diagram of a cellular communication system 101 having base stations and user stations. In FIG. 1, a communication system 101 for communication among a plurality of user stations 102 includes a plurality of cells 103, each with a base station 104, typically located at or near the center of the cell 103. Each station (both the base stations 104 and the user stations 102) may generally comprise a receiver and a transmitter. The user stations 102 and base stations 104 preferably communicate using frequency division duplex (FDD) techniques as further described herein, in which base stations 104 communicate over one frequency band and user stations 102 communicate over another frequency band. Communication is also conducted such that different user stations 102 transmit at different times (i.e., during different time slots), as further described herein.

As further shown in FIG. 1, the communication system 101 may also comprise a base station controller 105 which connects to the base stations 104 in a particular geographic region. The base station controller 105 aggregates inputs from multiple base stations 104 and relays information from the base stations 104 to a mobile switching center (MSC) (not shown) and ultimately to a public switched telephone network (PSTN, or "network") (not shown). The base station controller 105 also relays information from the network to the individual base stations 104. The base station controller 105 may, if necessary, perform conversion of signaling messages relating to such things as mobility management and call control, to make the signaling messages compatible with the communication protocol used by the base stations 104.

In one aspect of one or more of the embodiments disclosed herein, methods and apparatus are provided for adapting, modifying or converting TDD equipment (including a TDD user station and/or base station) to perform FDD communication. In addition, a novel frame structure for communication is provided, particularly well-suited to the adaptation, modification or conversion of TDD equipment to perform FDD communication. A prior art TDD frame structure is briefly described below, in conjunction with a description of TDD equipment for communicating within the TDD frame structure, after which the inventive techniques presented by the invention are discussed in greater detail.

Figure 2:
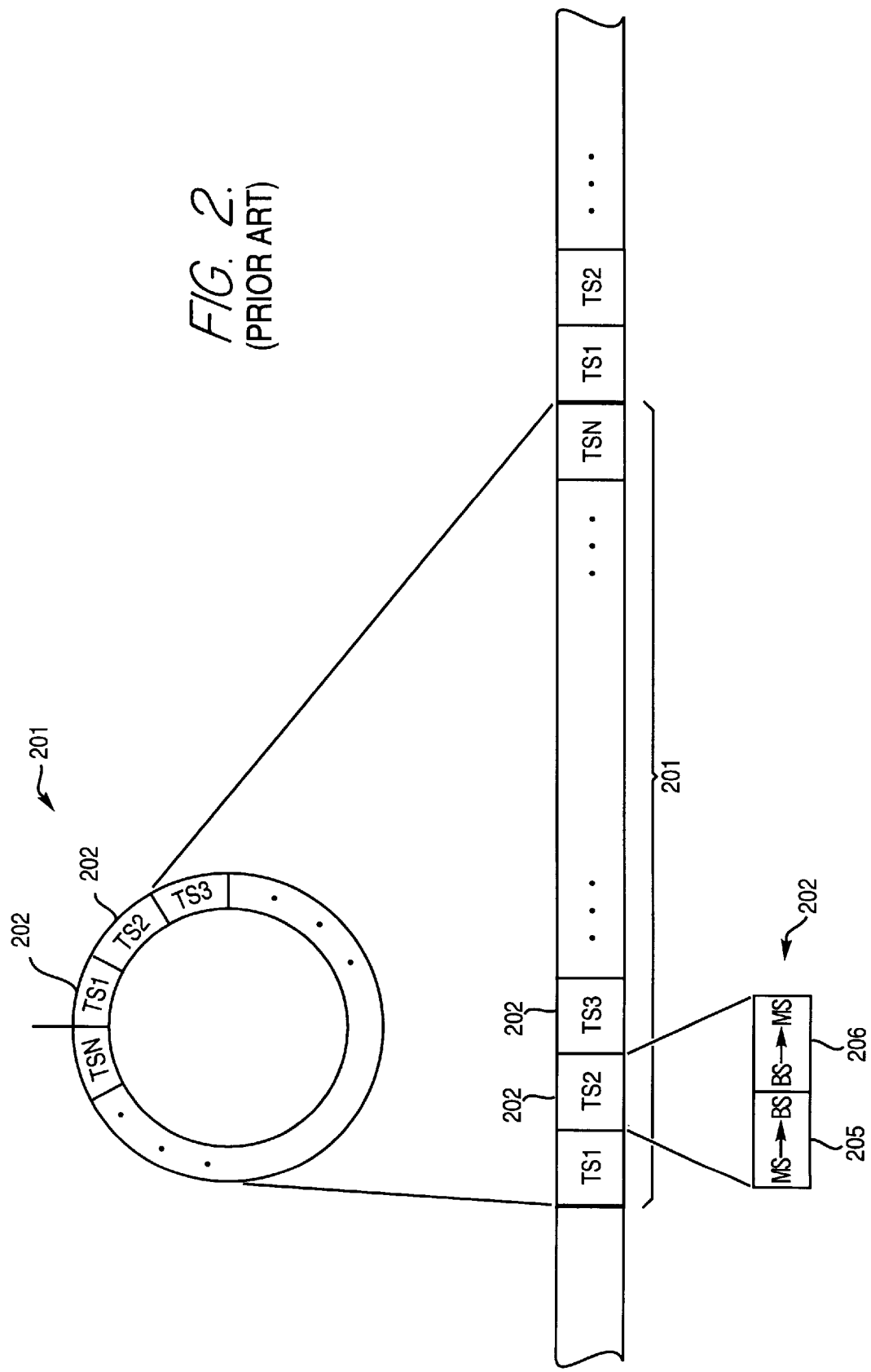
FIG. 2 is a diagram of an exemplary TDD frame structure as known in the art.
Figure 3:
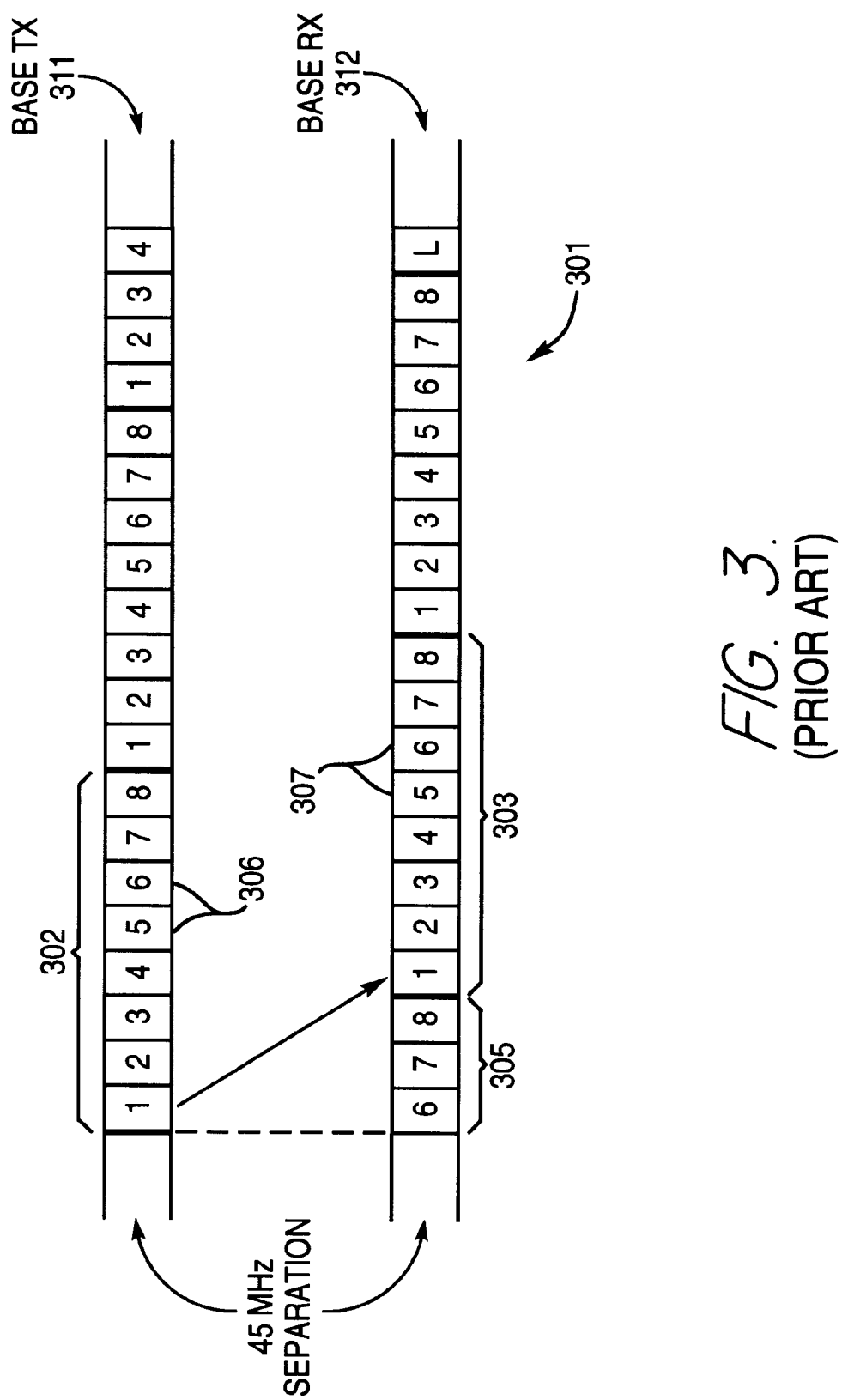
FIG. 3 is a diagram of a GSM frame structure.

FIG. 2 is a diagram of a particular TDD frame structure as known in the art. In FIG. 2, a repeating major time frame 201 comprises a plurality of time slots (or minor time frames) 202. Each time slot 202 can be assigned by the base station 104 to a user station 102. User stations 102 can be assigned more than one time slot 202 if desired, and the time slots 202 so assigned may or may not be contiguous.

As further shown in FIG. 2, each time slot 202 comprises two time segments 205, 206. In the first (i.e., user transmission) time segment 205, the user station 102 to which the time slot 202 is assigned transmits a user-to-base message 211 to the base station 104. In the second (i.e., base transmission) time segment 206, the base station 104 transmits a base-to-user message 212 to the user station 102 to which the time slot 202 is assigned. Each user station 102 thereby transmits and receives in its assigned time slot 202, thus allowing multiple user stations 102 to communicate with the same base station 104.

Figure 4:
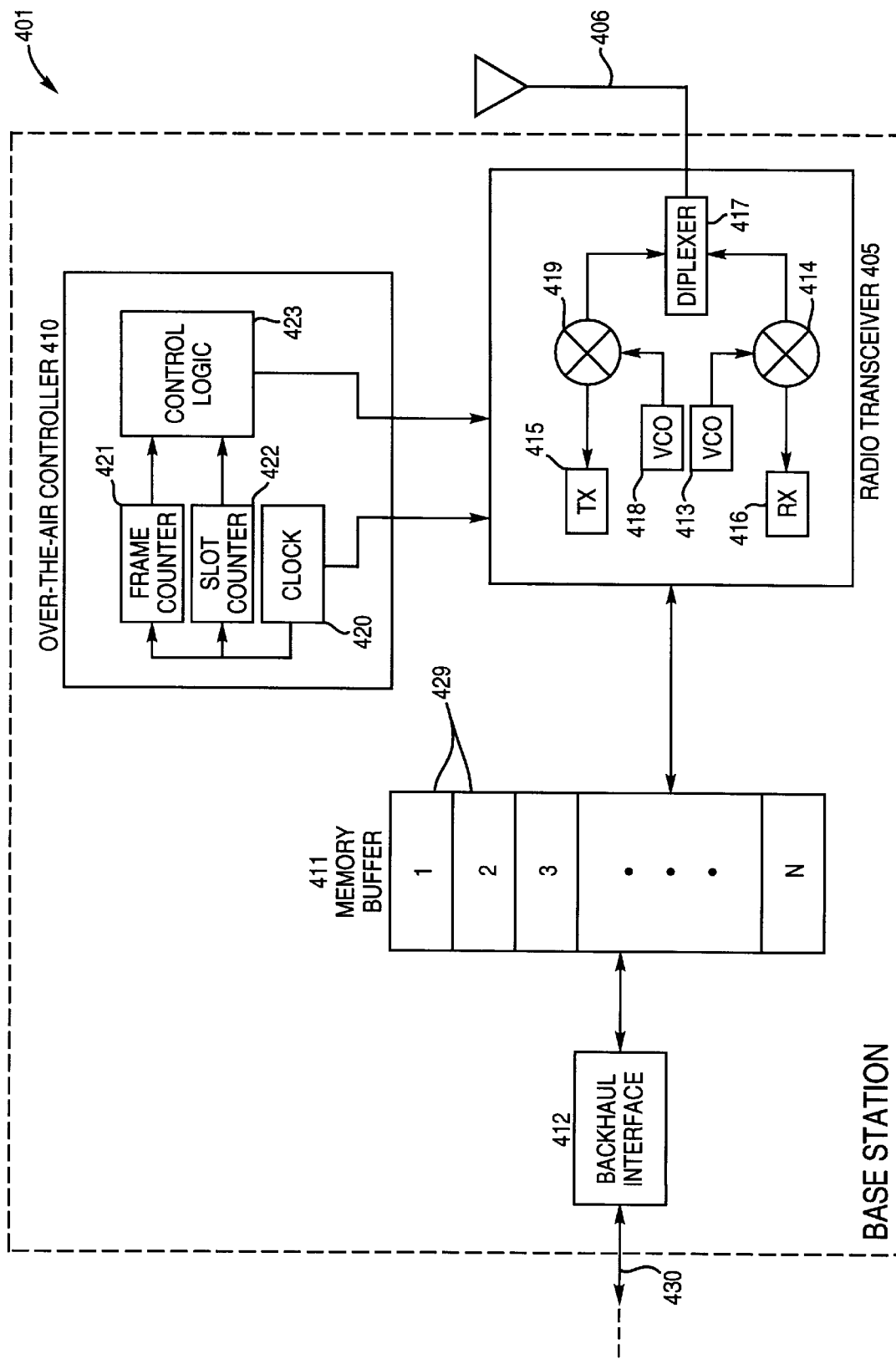
FIG. 4 is a block diagram of a base station.
Figure 8:
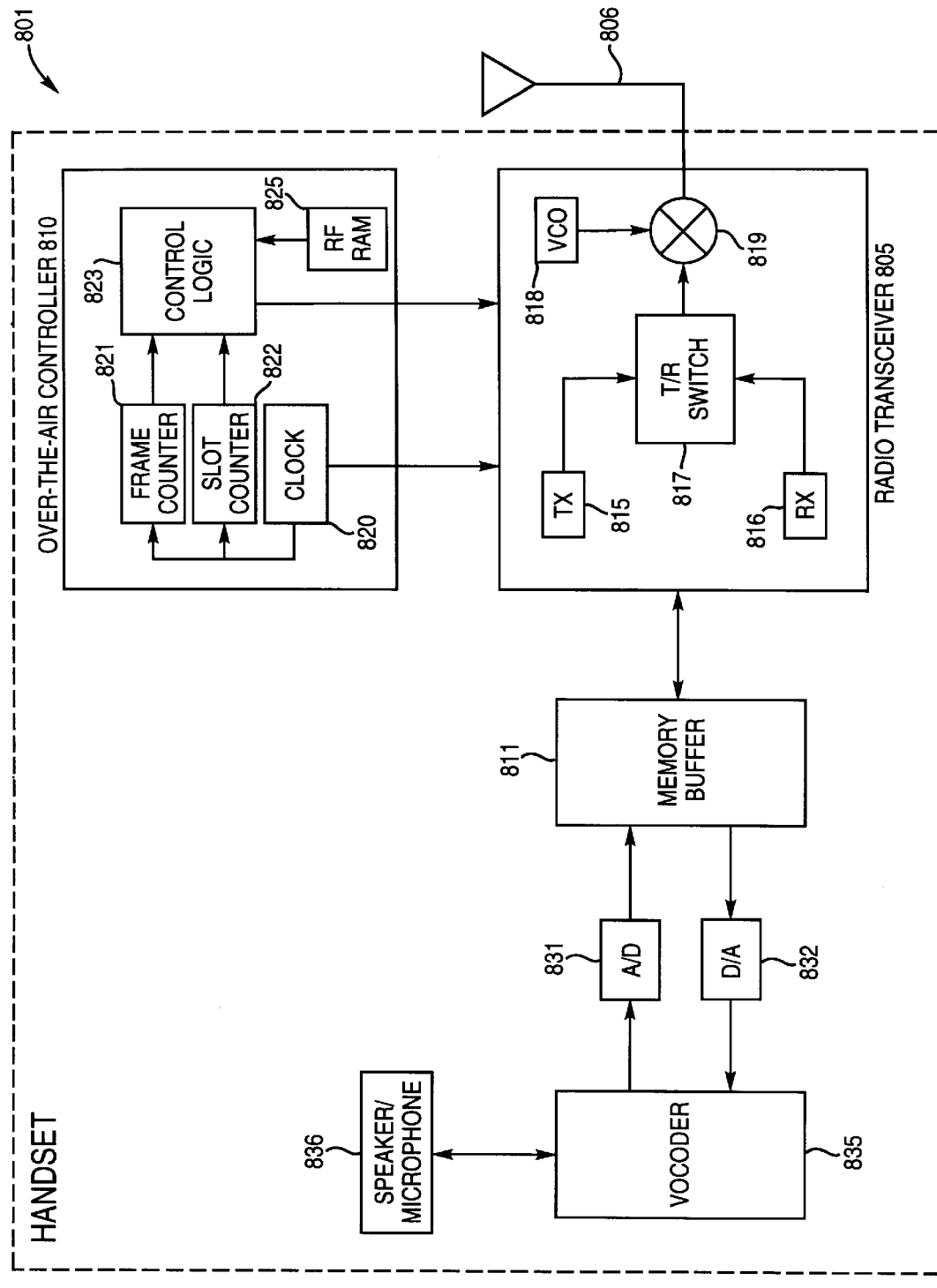
FIG. 8 is a block diagram of a user station (e.g., a handset) having a single frequency synthesizer.

FIGS. 4 and 8 are block diagrams of a base station 401 and user station 801, respectively, which may in a particular configuration be utilized for communicating according to a prior art over-the-air TDD protocol such as shown in FIG. 2. As shown in FIG. 4, the base station 401 preferably comprises a radio transceiver 405 (comprising, among other things, a transmitter 415 and a receiver 416), an antenna 406 connected to the radio transceiver 405, and an over-the-air controller 410 also connected to the radio transceiver 405. The over-the-air controller 410 is connected to a memory buffer 411, which the over-the-air controller 410 shares with a backhaul line controller 412. The over-the-air controller 410 oversees retrieval of information from the memory buffer 411 by the radio transceiver 405 for transmission to the various user stations 102 with which the base station 401 communicates, and storage of information into the memory buffer 411 by the radio transceiver 405 when such information is received from the user stations 102. The backhaul line controller 412 removes information from the memory buffer 411 to transmit over a backhaul line 430 to the network, and stores information from the backhaul line 430 received from the network in the memory buffer 411, so as to make it available for the radio transceiver 405. In this manner, information is passed from the user stations 102 to the network, and back, so that telephone calls or similar communication links can be supported.

FIG. 4 also shows further details of the over-the-air controller 410. As shown therein, the over-the-air controller 410 comprises a clock 420 connected to a time frame counter 421 and a time slot counter 422. The time frame counter 421 and time slot counter 422 are connected to control logic 423, which uses outputs from the time frame counter 421 and time slot counter 422 to format messages for over-the-air communication. Under control of the over-the-air controller 410, the radio transceiver 405 stores and removes information from the memory buffer 411.

In addition to the transmitter 415 and receiver 416, the radio transceiver 405 further comprises a transmitter (VCO) (voltage-controlled oscillator) 418 connected to a mixer 419 for converting data output from the transmitter 415 to a desired transmission frequency, and a receiver VCO 413 connected to a mixer 414 for converting data received by the base station 401 to a desired reception frequency for processing by the receiver 416. The mixers 418 and 419 may be coupled to a diplexer 417, which is connected to the antenna 406.

The operational frequency of the base station 401 may be selected by selecting a desired voltage (by way of control bits from the over-the-air controller 410, for example) for the transmitter VCO 418 and receiver VCO 413, thereby setting the desired frequency output. If the base station 401 is configured for TDD communication using a single frequency band (such as according to the frame structure 201 shown in FIG. 2) for both base station and user station transmissions, then both the transmitter VCO 418 and the receiver VCO 413 may be set to the same frequency. On the other hand, if the base station 401 is configured for FDD communication, as described, for example, with respect to the frame structure disclosed herein, then the transmitter VCO 418 and the receiver VCO 413 may be set to different frequencies (at a frequency separation of, e.g., 45 MHz). Frequency selection may be accomplished dynamically under control of the over-the-air controller 410. Additionally, processing of data for transmission or after reception may generally be controlled by the control logic 423 of the over-the-air controller 410.

To facilitate rapid or convenient storage and extraction of data, the memory buffer 411 may be partitioned into memory segments 429, each memory segment 429 corresponding to one time slot 202. In one embodiment, for example, the current time slot (as output from, for example, the slot counter 422) can be used as a pointer offset to control which memory segment 429 the radio transceiver 405 is accessing at a given time. If TDD communication is employed, or base station transmissions and user station transmissions are otherwise distinguished by time, the memory segments 429 can be organized such that the data for the user transmission time segment 205 and data for the base transmission time segment 206 are stored adjacent to one another. Alternatively, the memory segments 429 can be organized such that the data for all of the user transmission time segments 206 are stored in one half of the memory buffer 411, and the data for all of the base transmission time segments 205 are stored in the other half of the memory buffer 411. A control signal from the control logic 423 may be provided which toggles or changes state each time segment (i.e., at every transition between base and user time slots), and can be used as a pointer offset to control whether the radio transceiver 405 will access the "upper" half of the memory buffer 411 or the "lower" half of the memory buffer 411 (i.e., the user transmission data or the base transmission data) at a given point in time.

The base station 401 shown in FIG. 4 may provide for selection of transmission and reception frequency, so as to allow deployment of the base station 401 in a cellular environment in which different cells 103 (see FIG. 1) are assigned a different frequencies (consistent with a repeating pattern, such as a three-cell or seven-cell repeating pattern, as disclosed, for example, in U.S. Pat. No. 5,402,413, incorporated herein by reference as if set forth fully herein). The base station 401 can be deployed with the desired frequency by, for example, selecting external switches on the base station 401 or preferably by programming the desired frequency using software or firmware of the over-the-air controller 410.

FIG. 8 is a block diagram of a user station 801 (e.g., a handset) which, in one configuration, may be used for communicating according to an over-the-air TDD protocol such as shown in FIG. 2, and which in one respect may represent, for example, a TDD handset to be converted for use in FDD communication. As shown in FIG. 8, the user station 801 includes a radio transceiver 805 (comprising, among other things, a transmitter 815 and a receiver 816), an antenna 806 connected to the radio transceiver 805, and an over-the-air controller 810 also connected to the radio transceiver 805. The over-the-air controller 810 is connected to a memory buffer 811. The over-the-air controller 810 manages the retrieval of information from the memory buffer 811 by the radio transceiver 805 for transmission to the base station 104 with which the user station 801 communicates, and the storage of information into the memory buffer 811 by the radio transceiver 805 when such information is received from the base station 104.

The memory buffer 811 is connected to an analog-to-digital (A/D) converter 831 and a digital-to-analog (D/A) converter 832. Both the AID converter 831 and the D/A converter 832 are connected to a vocoder 835, which is connected to a speaker/microphone 836. Information received from the base station 104 and stored in the memory buffer 811 is converted from a digital format to an analog format by D/A converter 832. The vocoder 835 then processes the analog formatted information and sends a signal to speaker/microphone 836 to generate audible voice or other sounds to the user/listener. The speaker/microphone 836 also picks up audible voice or other sounds from the user, and relays an analog data signal to the vocoder 835. The vocoder 835 processes the analog data signal, and sends the processed analog data signal to A/D converter 831 for conversion to a digital format. The digital formatted data is then stored in the memory buffer 811, and made available for transmission to the base station 104 in the appropriate time slot.

FIG. 8 also shows further details of the over-the-air controller 810. As shown therein, the over-the-air controller 810 comprises a clock 820 connected to a time frame counter 821 and a time slot counter 822. The time frame counter 821 and time slot counter 822 are connected to control logic 823, which uses outputs from the time frame counter 821 and time slot counter 822 to format messages for over-the-air communication. Under control of the over-the-air controller 810, the radio transceiver 805 stores and removes information from the memory buffer 811. The radio transceiver 805 further comprises a transmit/receive (T/R) switch 817 to allow selection between a transmission mode and a reception mode. The control logic 823 of the over-the-air controller 810 controls the T/R switch 817, and thereby selects between the transmission mode and reception mode based, for example, upon the current portion of the time frame. For example, if the user station 801 is operating using the time frame 201 of FIG. 2, then the over-the-air controller 810 selects a transmission mode during the user transmission time segment 205 of the assigned time slot 202, and selects the position or state of the T/R switch 817 accordingly. Similarly, the over-the-air controller 810 selects a reception mode during the base transmission time segment 206 of the assigned time slot 202, and selects the position or state of the T/R switch 817 accordingly.

The control logic 823 is connected to an RF memory store 825 (such as a RAM) which holds a set of programmable frequency values. The VCO 818 may be programmed according to the programmable frequency values stored in the RF RAM 825. Consequently, as the user station 801 moves between cells 103 or monitors communications from base stations 104 of neighboring cells 103, the VCO 818 may be tuned to the desired frequency to allow the user station 801 to communicate with other base stations 104, or to perform a handover, assuming different cells 103 utilize different frequencies.

While it might be desired to adapt or modify user station 801 to support FDD communication, a problem faced in attempting such an adaptation or modification is that the user station 801 has only a single radio transceiver 805 (since only one frequency band is used in the TDD frame structure) and, consequently, only a single frequency synthesizer (i.e., VCO 818). Consequently, the user station 801 cannot transmit and receive simultaneously. In addition, the user station 801 experiences a finite but potentially significant delay associated with transitioning between transmission and reception frequencies. Given typical hardware performance constraints, a user station 801 with a single radio transceiver 805 would ordinarily be unable to support a time frame structure in which the user station 801 was required to transmit and receive in consecutive time segments (i.e., with "zero offset") on two separate frequencies.

According to one embodiment disclosed herein, a TDD user station (such as handset 801 shown in FIG. 8) which has been originally configured to operate according to a TDD time frame (such as time frame 201 shown in FIG. 2) is adapted to operate in an FDD environment, using a novel FDD frame structure that does not require simultaneous transmission and reception of signals. Similarly, a TDD base station (such as base station 401 shown in FIG. 4) originally configured to support a TDD time frame (such as time frame 201 shown in FIG. 2) may also be adapted to operate in an FDD environment and in general accordance with a novel FDD frame structure that does not require simultaneous transmission and reception of signals, and permits modified TDD (i.e., single-radio) user stations to operate according to the novel FDD frame structure.

Figure 5A:
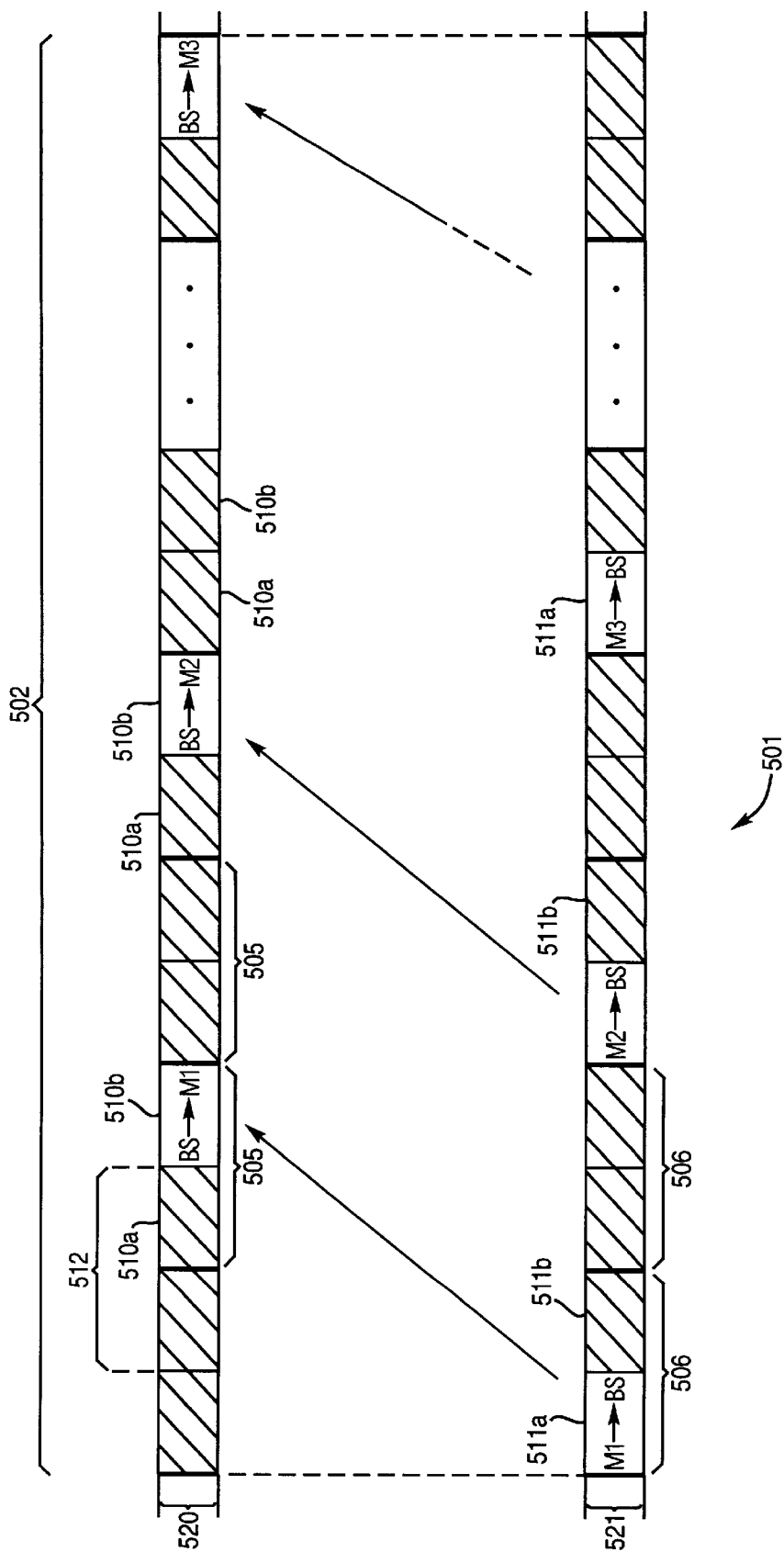
FIGS. 5A and 5B are diagrams of a frame structure for FDD communication between a base station and TDD user stations adapted for FDD communication.
Figure 5B:
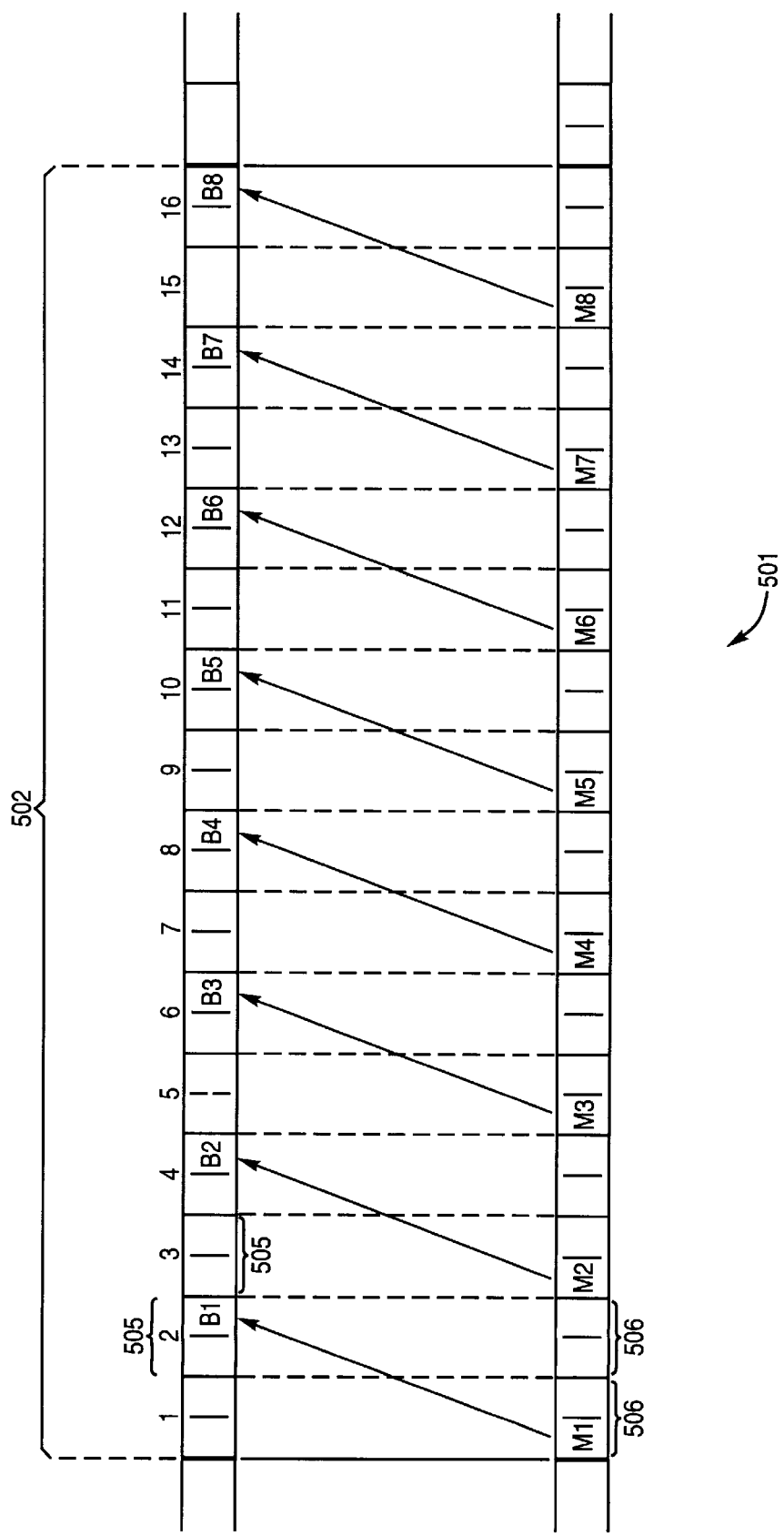

In one embodiment, a base station 401 and its associated user stations 801 are modified or otherwise adapted or reconfigured to communicate according to a repeating pattern defined by a frame structure 501 depicted in FIGS. 5A and 5B. As shown in FIG. 5A, a time frame 502 comprises a plurality of time slots 503. Time slots 503 comprise a plurality of base transmit time slots 505 with respect to a base transmission frequency band 520, and a plurality of user transmit time slots 506 (also referred to as base receive time slots) with respect to a user transmission frequency band 521 (also referred to as a base reception frequency band). The base transmit time slots 505 are divided into a first time segment 510a and a second time segment 510b, each of which preferably comprises one-half of the base transmit time slot 505. Similarly, the user transmit time slots 506 are divided into a first time segment 511a and a second time segment 511b, each of which preferably comprises one-half of the user transmit time slot 506, and which match the timing of the first time segment 510a and second time lo segment 510b, respectively, of the base transmit time slots 505. A more complete illustration of the frame structure 501 appears in FIG. 5B.

As explained below in more detail, not all of the base transmit time slots 505 and user transmit time slots 506 are utilized for communication. Rather, some (or portions of some) are used for allowing a time period for transmit/receive switching at the user station 102, and potentially for other timing delays (such as propogation and/or processing delays) that might be encountered. As illustrated in FIGS. 5A and 5B, transmissions from user stations 102 sent over the user transmission frequency band 521 alternate in time with transmissions from the base station 104 sent over the base transmission frequency band 520. From the standpoint of alternating base station and user station transmissions, the frame structure 501 of FIGS. 5A and 5B bears some similarity to a TDD frame structure. However, unlike the TDD frame structure described earlier herein with relation to FIG. 2, the user station transmissions are on a different frequency band than the base station transmissions. As a consequence, the TDD base station 401 described earlier with respect to FIG. 4 would, as ordinarily configured, be unable to support the frame structure 501 (or any other type of FDD frame structure) without modification. Likewise, the TDD user station 801 described earlier with respect to FIG. 8 would, as ordinarily configured, be unable to support the frame structure 501 (or any other type of FDD frame structure) without modification.

According to one aspect of the frame structure 501 depicted in FIGS. 5A and 5B, active base transmit time slots 505 are alternated in time sequence with active user transmit time slots 506. In addition, within a base transmit time slot 505, the first time segment 510a (corresponding to the user transmit time segment 205 of the TDD time slot 202 for which the base station 401 was originally configured) is designated null and void (i.e., unused), and within a user transmit time slot 506 the second time segment 611b (corresponding to the base transmit time segment 206 of the TDD time slot 202 for which the user station 801 was originally configured) is likewise designated null and void. In the embodiment shown in FIGS. 5A and 5B, the user stations 102 therefore transmit in every other user transmit time slot 506 over the user transmission frequency band 521, and the base station 104 likewise transmits in every other base transmit time slot 505 over the base transmission frequency band 520. The intervening users transmit time slots 506 for the user transmission frequency band 521 and the intervening base transmit time slots 505 for the base transmission frequency band 520 remain "dark" or unused. Additionally, the first time segment 510a of an "active" base transmit time slot 505 and the second time segment 511b of an "active" user transmit time slot 506 also remain dark or unused.

In the embodiment illustrated in FIGS. 5A and 5B, the base station 104 carries out an entire duplex communication (i.e., forward link and reverse link transmission) with a given user station 102 before handling communication with the next user station 102. In a preferred version of this embodiment, a duplex pairing of transmissions occurs in adjacent time slots, with an intervening time period (defined by the two unused time segments 511b and 510a) between the pair of transmission that remains unused so as to allow transmit/receive switching by the user station 102. In more detail, as depicted in FIGS. 5A and 5B, a first user station (designated "M1") transmits to the base station (designated "BS") in a first time segment 511a of a first user transmit time slot 506, and the base station BS transmits to the first user station M1 in the second time segment 510b of the second base transmit time slot 505 (with the first base transmit time slot 505 and the second user transmit time slot 506 being "dark" or unused). Similarly, the second user station (designated "M2") transmits to the base station BS in the third user transmit time slot 506, and the base station BS transmits to the second user station M2 in the fourth base transmit time slot 505 (with the third base transmit time slot 505 and the fourth user transmit time slot 506 being "dark" or unused). This pattern of communication is repeated for the entirety of the time frame 502, and again for each succeeding time frame 502.

Figure 9:
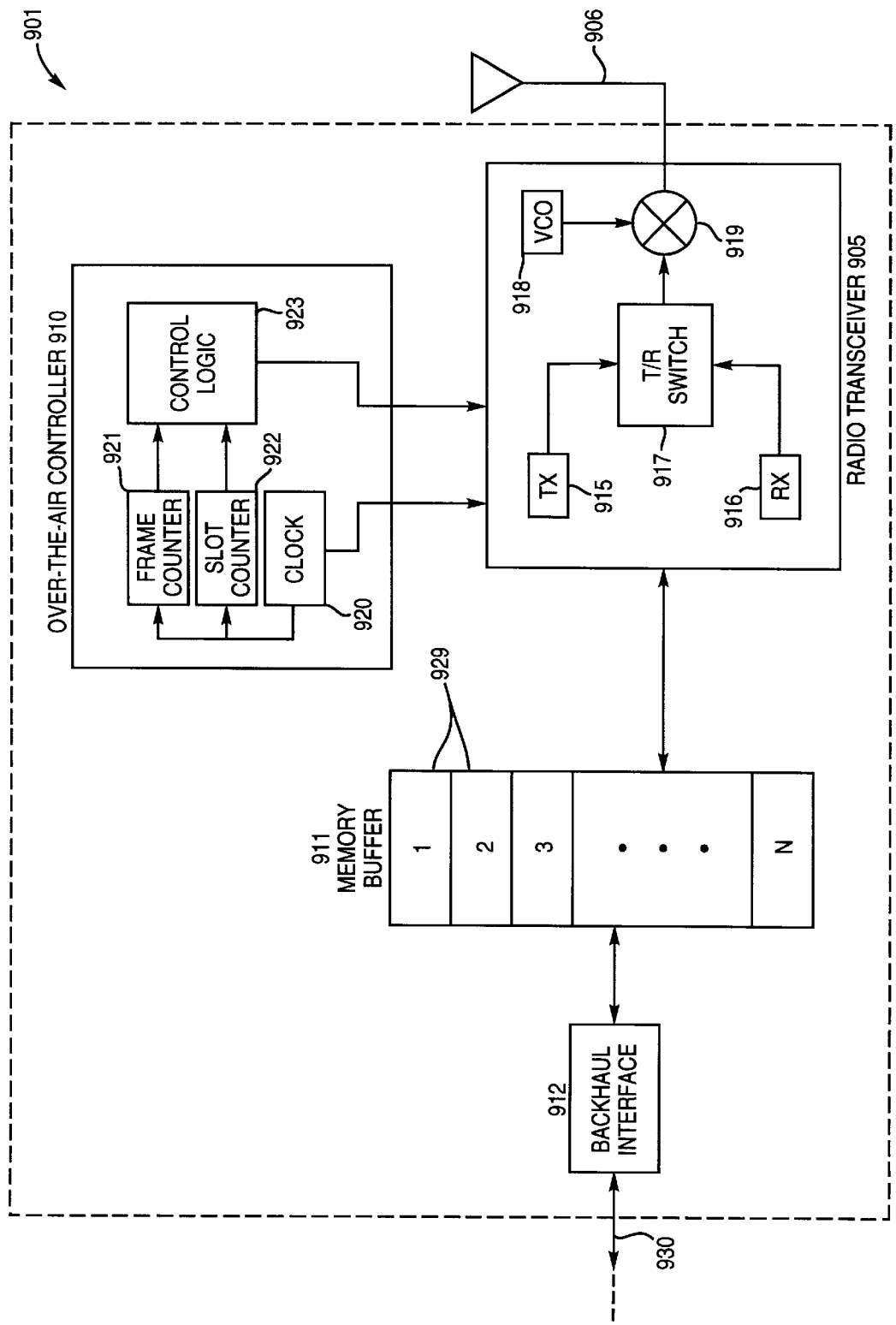
FIG. 9 is a block diagram of a base station having a single frequency synthesizer.

A transmit/receive switching time segment 512 is defined by the aggregation of the second time segment 511b of an active user transmit time slot 506 and the first time segment 510a of an active base transmit time slot 505. During the transmit/receive switching time segment 512, the user station 102 currently engaged in communication with the base station 104 switches its radio between the user transmit frequency 521 and the base transmit frequency 520, and enters a reception mode. At the same time, the base station 104 also switches its radio between the user transmit frequency 521 and the base transmit frequency 520, and enters a transmission mode. After the base station 104 completes its transmission in the second time segment 510b of the base transmit time slot 505, the base station 104 switches its radio between the base transmit frequency 520 and the user transmit frequency 521, in preparation of receiving a transmission from the next user station 102.

Where the base station 104 comprises two separate frequency synthesizers (such as the base station 401 comprising VCOs 413 and 419, as well as a diplexer 417, as shown in FIG. 4), the base station 104 is able to receive a user station transmission on a different frequency immediately after making a transmission. If the base station 104 had only a single frequency synthesizer, however, then a time period (e.g., a full time slot) might need to be provided in the frame structure each time the base station switches between frequencies, to allow re-tuning of the single frequency synthesizer of the base station radio. An example of such a base station is shown in FIG. 9 and discussed later herein.

It may be observed that the frame structure 501 illustrated in FIGS. 5A and 5B reduce system capacity in a cell 103 to one-half that of the TDD frame structure 201 shown in FIG. 2, for example, and to one-quarter that of "true FDD." However, the frame structure 501 shown in FIGS. 5A and 5B has the advantage of requiring minimal hardware and/or software modifications to the TDD equipment in order make it useful for performing FDD communication.

A user station (such as user station 801) originally configured to support TDD communication may be modified or otherwise adapted to provide for frequency switching and expanded separation of the user transmission and base transmission, so as to support an FDD frame structure such as frame structure 501 shown in FIGS. 5A and 5B. Such modifications to the user station 801 may include hardware modifications and/or software modifications. For example, the over-the-air controller 810 may be modified such that it switches the programmable VCO 418 between the base transmission frequency band 520 and the user transmission frequency band 521, synchronized with the timing of the base transmit time slot(s) 505 and user transmit time slot(s) 506 assigned to the user station 801. In response to a frequency-select control signal (which can be derived, for example, from the slot counter 822 based on whether the slot count is even or odd), the over-the-air controller 810 selects the user transmission frequency band 521 for the assigned user transmit time slot(s) 511a, and the base transmission frequency band 520 for the assigned base transmit time slot(s) 510b. The over-the-air controller 810 controls the T/R switch 817 of the user station 801 in a similar manner as with the frame structure 201 shown in FIG. 2, i.e., by placing the T/R switch 817 in a transmission mode or state during the assigned user transmit time slot(s) 511a, and in a reception mode or state during the assigned base transmit time slot(s) 510b.

In addition, the over-the-air controller 810 of the user station 801 can be modified so as to account for the one time slot delay (i.e., transmit/receive switching time segment 512) between the pair of duplex transmissions to and from the user station 801. To this end, the over-the-air controller 810 causes loading of data from the memory buffer 811 and transmission of such data one time slot later than the data would otherwise have been loaded and transmitted according to the TDD frame structure 201 shown in FIG. 2. A modification to the over-the-air controller 810 to perform this function may be made through software, by the addition of a software time delay (for instance, a software timing loop) that is initiated when the user station 801 toggles from its transmission mode to the reception mode.

In a preferred embodiment, the frame counter 821 and slot counter 822 of each user station 801 are "synchronized" with the assigned channel such that, from the perspective of the user station 801, the user transmit time slot 511a assigned to the user station 801 occurs in the last time slot 506 of a time frame 502, and the corresponding base transmit time slot 510b occurs in the first time slot 505 of the time frame 502, assuming only one time slot is assigned to the user station 801. When the user station 801 first establishes a communication channel with the base station, the frame counter 821 and slot counter 822 are synchronized in the above-described manner. In such an embodiment, the programmable VCO 818 is switched between the base station transmission frequency 520 and user station transmission frequency 521 a sufficient time in advance of the upcoming transmission/reception so that the programmable VCO 818 will stabilize at the correct frequency beforehand.

Figure 6A:
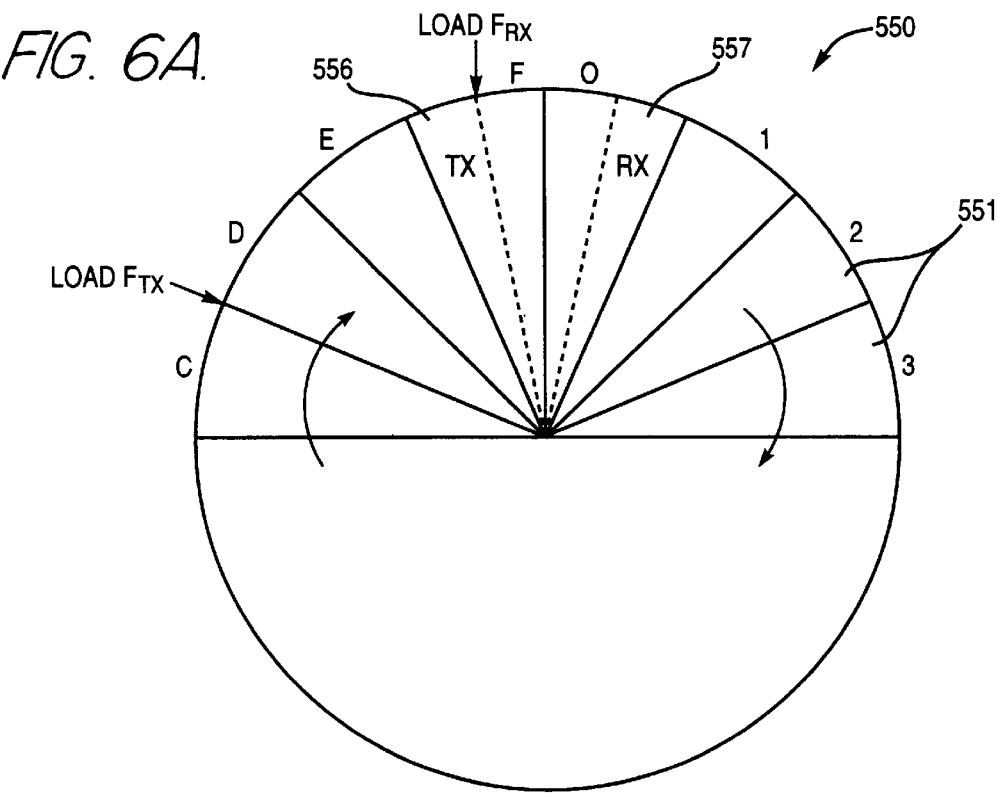
FIG. 6A is a timing diagram illustrating an example of relative times of re-tuning a frequency synthesizer in the user station in order to perform FDD communication.

Further details of this process are shown in FIG. 6A. FIG. 6A depicts a timing loop 550, which is another way of representing the repeating time frame 502 of FIGS. 5A and 5B, and helps illustrate the timing by which the programmable VCO 818 is switched over the course of a time frame 502. The timing loop 550 comprises a plurality of consecutive time slots 551 (e.g., sixteen time slots). When a communication channel is first established, the user station 801 re-synchronizes or resets its internal timing such that its assigned channel includes the first time segment 556 of the last time slot 551 (i.e., of time slot fifteen), and the second time segment 557 of the first time slot 551 (i.e., of time slot zero). The control logic 823 of the over-the-air controller 810 is programmed so as to load the user station transmission frequency $F_{TX}$ one or two time slots 551 prior to the user station transmission segment 556—for example, at the start of time slot thirteen, as illustrated in FIG. 6A—and to load the base station transmission frequency $F_{RX}$ at the end of the user station transmission segment 556, one full time slot period before the base station transmit time segment 557. This timing ensures that the programmable VCO 818 will have enough time to stabilize between the user station transmission to the base station 104 and the corresponding base station transmission to the user station 801.

Figure 6B:
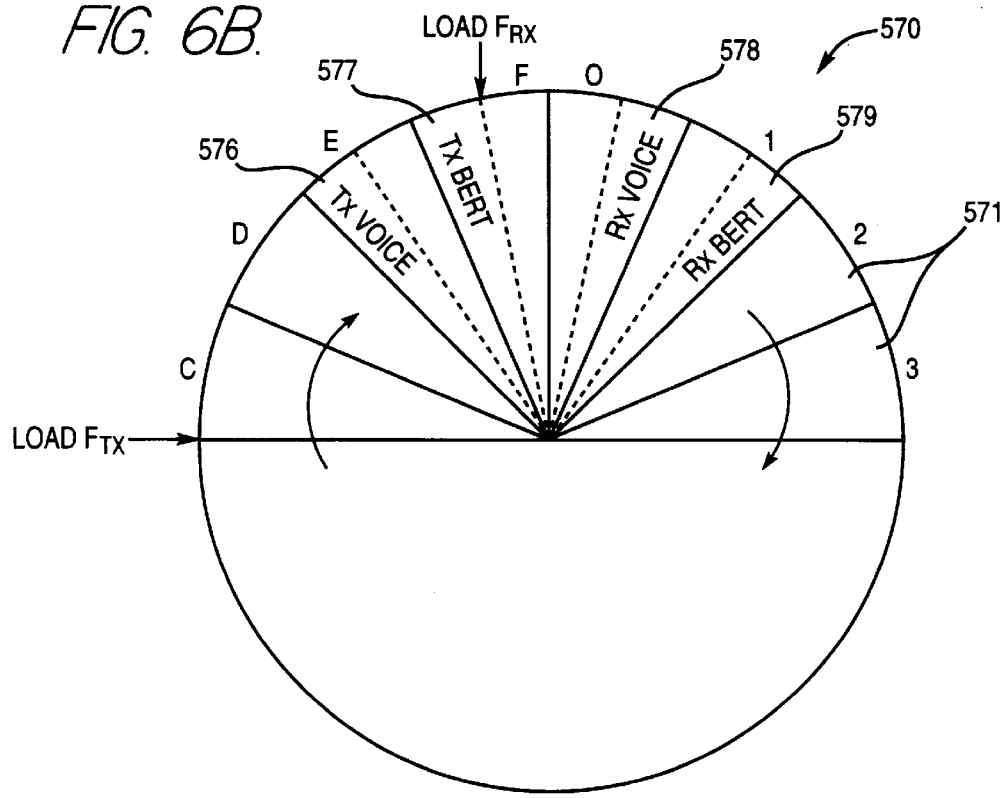
FIG. 6B is a timing diagram illustrating an example of relative times of re-tuning a frequency synthesizer in the user station when transmitting error checking data in addition to voice data.

FIG. 6B is a timing diagram illustrating an embodiment in which the programmable VCO 818 is re-tuned when the user station 801 and base station 104 are to exchange error checking data in addition to other data (e.g., voice or bearer data). In FIG. 6B, similar to FIG. 6A, a timing loop 570, representing a repeating time frame 502 such as shown in FIGS. 5A and 5B, comprises a plurality of consecutive time slots 571. In the particular embodiment reflected in FIG. 6B, both the user station transmission and the base station transmission are followed by a bit error rate (BERT) transmission which is utilized by the recipient to analyze the quality of its own transmission and adjust the power level or other transmission characteristics if necessary. A special test mode in which BERT transmissions are sent may be provided, whereas the normal mode of operation would be that of FIG. 6A. Where BERT transmissions are sent, the user station 801 may re-synchronize or reset its timing such that the user station transmission for its assigned channel occurs in the first time segment 576 of the second-to-last time slot 571, and the corresponding base station transmission occurs in the second segment time segment 578 of the first time slot 571. A user station BERT transmission may be sent in the first time segment 577 of the last time slot 571, while a base station BERT transmission may be sent in the second time segment 579 of the second time slot 571.

The re-tuning of the frequency synthesizer (i.e., programmable VCO 818) in the user station 801 preferably occurs with a timing similar to that of FIG. 6A. Accordingly, the control logic 823 of the over-the-air controller 810 is programmed so as to load the user station transmission frequency $F_{TX}$ one or two time slots 571 prior to the user station transmission segment 576—for example, at the start of time slot twelve, as illustrated in FIG. 6B—and to load the base station transmission frequency $F_{RX}$ at the end of the user station transmission segment 577 for the user station BERT transmission, one full time slot period before the base station transmission segment 578. This timing ensures that the programmable VCO 818 will have enough time to stabilize between the user station transmissions to the base station 104 and the corresponding base station transmissions to the user station 801.

The re-tuning of the programmable VCO 818 is managed by the control logic 823 of the over-the-air controller 810. Because most FDD systems generally require that the base station 104 be assigned a different set of frequencies for transmission than the user stations 102, the RF RAM 825 in the user station 801 is preferably expanded to hold twice as many programmable frequency values, with half of the programmable frequency values pertaining to the base station transmission frequency band 520, and the other half of the programmable frequency values pertaining to the user station transmission frequency band 521.

According to aspects of the embodiments disclosed herein, a user station originally configured for TDD communication, and having only a single programmable frequency synthesizer, may be adapted or modified to support FDD communication with a minimum of hardware and/or software modifications.

In addition, a base station originally configured for TDD communication, and having a single frequency synthesizer, may be adapted to support the frame structure 501 shown in FIGS. 5A and 5B, using similar principles as described above for the user station 801. An example of a base station 901 with a single frequency synthesizer is shown in FIG. 9. Where a similarity of functionality exists, components of the base station 901 in FIG. 9 are identified by the same reference numerals as those of the base station 401 of FIG. 4, except that in FIG. 9 the reference numerals are designated by series 9xx, whereas in FIG. 4 the reference numerals are designated by series 4xx.

Accordingly, in FIG. 9, the base station 901 comprises a radio transceiver 905 (comprising, among other things, a transmitter 915 and a receiver 916), an antenna 906 connected to the radio transceiver 905, and an over-the-air controller 910 also connected to the radio transceiver 905. The over-the-air controller 910 is connected to a memory buffer 911, which the over-the-air controller 910 shares with a backhaul line controller 912. Similar to the base station 401 described with respect to FIG. 4, the over-the-air controller 910 oversees retrieval of information from the memory buffer 911 by the radio transceiver 905 for transmission to the various user stations 102 with which the base station 901 communicates, and storage of information into the memory buffer 911 by the radio transceiver 905 when such information is received from the user stations 102. The backhaul line controller 912 removes information from the memory buffer 911 to transmit over a backhaul line 930 to the network, and stores information from the backhaul line 930 received from the network in the memory buffer 911, so as to make it available for the radio transceiver 905. In this manner, information is passed from the user stations 102 to the network, and back, so that telephone calls or similar communication links can be supported.

FIG. 9 also shows further details of the over-the-air controller 910. As shown therein, the over-the-air controller 910 comprises a clock 920 connected to a time frame counter 921 and a time slot counter 922. The time frame counter 921 and time slot counter 922 are connected to control logic 923, which uses outputs from the time frame counter 921 and time slot counter 922 to format messages for over-the-air communication. Under control of the over-the-air controller 910, the radio transceiver 905 stores and removes information from the memory buffer 911.

The radio transceiver 905 further comprises a transmit/receive (T/R) switch 917 to allow selection between a transmission mode and a reception mode. The control logic 923 of the over-the-air controller 910 controls the T/R switch 917, and thereby selects between the transmission mode and reception mode based, for example, upon the current portion of the time frame. Thus, if the base station 901 is operating according to the frame structure of time frame 201 shown in FIG. 2, then the over-the-air controller 910 selects a reception mode during the user transmission time segment 205 of each time slot 202, and selects the position of the T/R switch 917 accordingly. Similarly, the over-the-air controller 910 selects a transmission mode during the base transmission time segment 206 of each time slot 202, and selects the position of the T/R switch 917 accordingly.

To facilitate rapid or convenient storage and extraction of data, the memory buffer 911 may be partitioned into memory segments 929, each memory segment 929 corresponding to one time slot 202. In one embodiment, for example, the current time slot (as output from, for example, the slot counter 922) can be used as a pointer offset to control which memory segment 929 the radio transceiver 905 is accessing at a given time. The memory segments 929 can be organized such that the data for the user transmission time segment 206 and data for the base transmission time segment 205 are stored adjacent to one another. Alternatively, the memory segments 929 can be organized such that the data for all of the user transmission time segments 206 are stored in one half of the memory buffer 911, and the data for all of the base transmission time segments 205 are stored in the other half of the memory buffer 911. In such a case, the control signal for the T/R switch 917 can be used as a pointer offset to control whether the radio transceiver 905 will access the "upper" half of the memory buffer 411 or the "lower" half of the memory buffer 411 (i.e., the user transmission data or the base transmission data).

To adapt or modify the base station 901 of FIG. 9 to perform FDD communication, the over-the-air controller 910 may be modified such that it toggles the programmable VCO 918 between the base transmission frequency band 520 and the user reception frequency band 521, synchronized with the timing of the base transmit time slots 505 and user transmit time slots 506. In response to a frequency-selection control signal (which, for example, can be derived from the slot counter 922 based on whether the slot count is even or odd), the over-the-air controller 910 selects the base transmission frequency band 520 for the even time slots 505 and 506, and the user transmit frequency band 521 for the odd time slots 505 and 506. The over-the-air controller 910 controls the T/R switch 917 of the base station 901 in the same manner as for the frame structure 201 shown in FIG. 2, by selecting it to be in a transmission mode or state during the even ones of time slots 505 and 506 and in a reception mode or state during the odd ones of time slots 505 and 506.

In addition, the over-the-air controller 910 of the base station 901 may be modified so as to account for the one time slot delay (i.e., transmit/receive switching time segment 512) between the duplex pair of transmissions to and from a given user station 102. To this end, the over-the-air controller 910 causes loading of data from the memory buffer 911 and transmission of the data one time slot later than the data would have otherwise been loaded and transmitted according to the TDD time frame 201 shown in FIG. 2. Such a modification to the over-the-air controller 910 may be made through software, by the addition of a software time delay (for instance, a software timing loop) that is initiated when the base station 901 toggles from a reception mode to a transmission mode.

Figure 7:
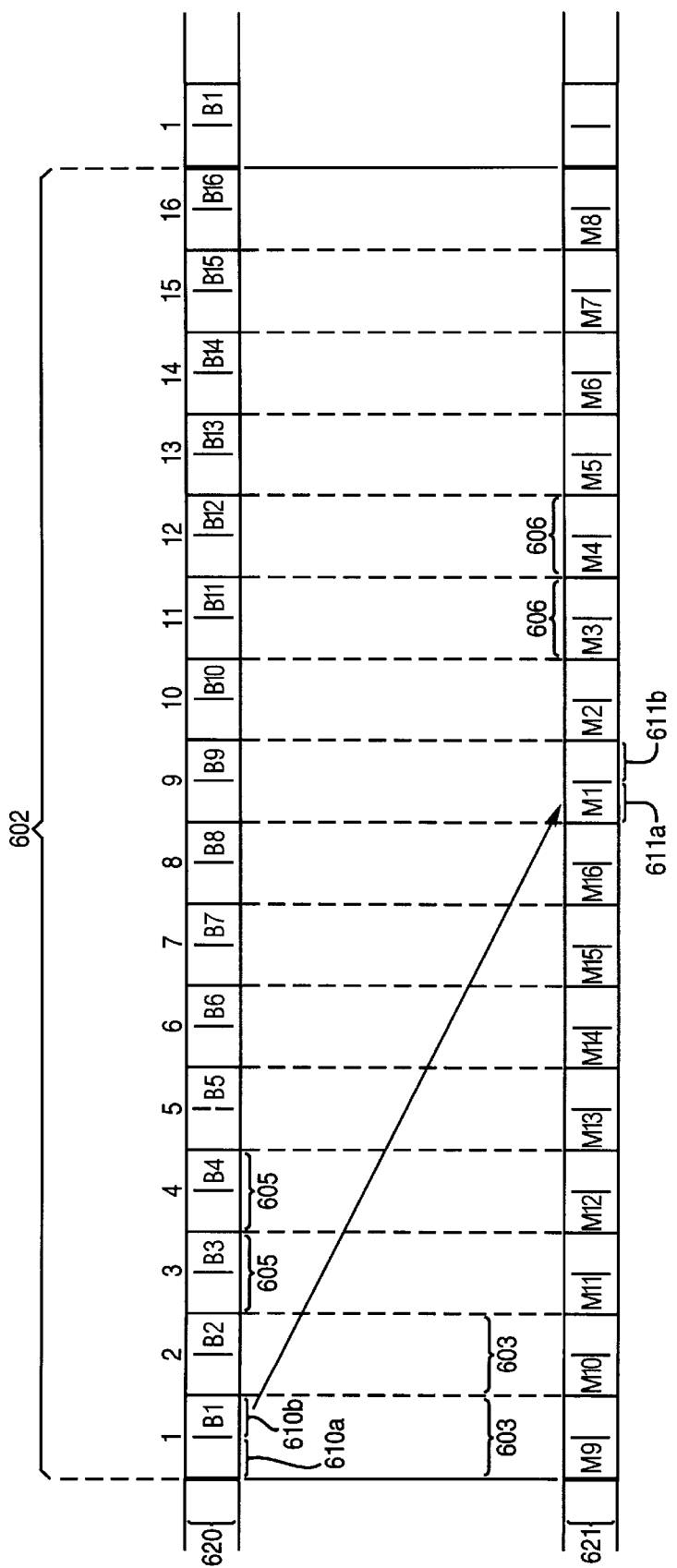
FIG. 7 is a diagram of an alternative frame structure for FDD communication between a base station and modified TDD user stations.

FIG. 7 is a diagram of an alternative frame structure 601 for FDD communication between a base station 104 and user stations 102 and, in particular, between a base station 104 and user stations 102 originally configured for TDD communication but which are modified or adapted to support FDD communication. In FIG. 7, a time frame 602 comprises a plurality of time slots 603. Time slots 603 include a plurality of base transmit time slots 605 with respect to a base transmission frequency band 620, and a plurality of user transmit time slots 606 (which may also be referred to herein as base receive time slots) with respect to a user transmission frequency band 621 (which may also be referred herein to as a base reception frequency band). The base transmit time slots 605 are divided into a first time segment 610a and a second time segment 610b, each of which preferably comprises one-half of the base transmit time slot 605. Similarly, the user transmit time slots 606 are divided into a first time segment 611a and a second time segment 611b, each of which preferably comprises one-half of the user transmit time slot 606, and which match the timing of the first time segment 610a and second time segment 610b, respectively, of the base transmit time slots 605.

As illustrated in FIG. 7, transmissions from user stations 102 sent over the user transmission frequency band 621 alternate in time with transmissions from the base station 104 sent over the base transmission frequency band 620. From the standpoint of alternating base station and user station transmissions, the frame structure 601 of FIG. 7 bears some similarity to a TDD frame structure. However, unlike the TDD frame structure described earlier herein with relation to FIG. 2, the user station transmissions are on a different frequency band than the base station transmissions.

According to one aspect of the frame structure 601 depicted in FIG. 7, within a base transmit time slot 605, the first time segment 610a (corresponding to the user transmit time segment 205 of the TDD time slot 202) is designated null and void (i.e., unused), and within a user transmit time slot 606 the second time segment 611b (corresponding to the base transmit time segment 206 of the TDD time slot 202) is likewise designated null and void. The user stations 102 therefore transmit in the first time segment 611a of the user transmit time slots 606, and the base station 104 transmits in the second time segment 610b of the base transmit time slots 605. Unlike the frame structure 501 of FIGS. 5A and 5B, all of the base transmit time slots 605 and user transmit time slots 606 may be used for communication in a time frame 602, and there is no enforced sequential alternation between active base transmit time slots and active user transmit time slots nor is it necessary to have "dark" or unused time slots. However, the frame structure 601 does have dark or unused time segments; specifically, the first time segment 610a of each base transmit time slot 605 and the second time segment 611b of each user transmit time slot 606 also remain dark or unused.

In another aspect of the frame structure 601 illustrated in FIG. 7, the base station 104 carries out overlapping duplex communications with the user stations 102, and does not complete an entire duplex communication transaction with a given user station 102 before handling communication with the next user station 102. In a preferred version of this embodiment, a duplex pairing of transmissions comprises a base station transmission on a base time slot 605 separated in time by approximately one-half a time frame 602 from the corresponding user station transmission on the user time slot 606, with the intervening time period allowing transmit/receive switching by the user station 102. As depicted in FIG. 7 (which illustrates a perspective of the base station), the base station (designated "BS") transmits a base-to-user message to a first user station (designated "M1") the second time segment 610b of a first base transmit time slot 605, and the user station M1 transmits to the base station BS in the first time segment 611a of the ninth user transmit time slot 606 (assuming a time frame 602 having sixteen base and user time slots 605 and 606). In the same time slot 603 that the base station BS transmits to the first user station M1, the ninth user station (designated "M9") transmits to the base station BS, but it does so in the first time segment 611a while the base station BS is not transmitting. The ninth user station M9 receives transmissions from the base station BS in the ninth time slot 603, as illustrated in FIG. 7. A repeating pattern of transmissions is therefore defined by the frame structure 601, whereby the base station 104 alternates transmissions with the user stations 102 within each time slot 603, and wherein each duplex channel comprises a base transmission followed by a corresponding user transmission separated by a predetermined number of time slots 603 (e.g., eight time slots). This pattern of communication is repeated for the entirety of the time frame 602, and for each succeeding time frame 602.

It may be observed that the frame structure 601 illustrated in FIG. 7 has twice the system capacity of the frame structure 501 illustrated in FIGS. 5A and 5B, the same system capacity as that of the TDD frame structure 201 shown in FIG. 2, and one-half the system capacity of "true FDD." As with the frame structure 501 shown in FIGS. 5A and 5B, the frame structure 601 shown in FIG. 7 has the advantage of requiring minimal hardware and/or software modifications to the TDD equipment in order make it useful for performing FDD communication.

A user station (such as user station 801) originally configured to support TDD communication may be modified or otherwise adapted to provide for frequency switching and expanded separation of the user transmission and base transmission, so as to support the FDD frame structure 601 shown in FIG. 7, in a similar way as described before with respect to support of the frame structure 501 shown in FIGS. 5A and 5B. However, rather than separating the user transmission and base transmission by a period equal to one time slot, with the frame structure 601 shown in FIG. 7 the user station 801 would be modified so as to separate these two transmissions by a period equal to the separation between the assigned user transmission time slot and base transmission time slot (i.e., about a half time frame, or eight time slots as considered from the perspective of the user station 801). Likewise, a base station originally configured for TDD communication can be modified to support the frame structure 601 shown in FIG. 7 in a manner similar to described with respect to FIGS. 5A and 5B, except that the base station (e.g., base station 401 in FIG. 4) would need to be reprogrammed or otherwise modified so that the over-the-air controller 410 maintained the proper association between the time slots and the user stations 102.

Assuming the base station 401 shown in FIG. 4 is originally configured to support TDD communication (i.e., according to the frame structure 201 shown in FIG. 2), certain modifications can be made to allow the base station 401 to support the FDD frame structure 601 shown in FIG. 7. For example, as a consequence of the splitting apart the forward link and reverse link transmissions from one another, the over-the-air controller 410 of the base station 401 may be modified so that the mapping of information into and out of the memory buffer 411 carried out by the radio transceiver 405 (under control of the over-the-air controller 410) is adjusted accordingly. In other words, the over-the-air controller 410 is reconfigured so that it causes the radio transceiver 405 to store and extract packet data in the proper memory segment 429 of the memory buffer 411 corresponding to the particular user station 102. One way this can be achieved in software is by use of a slot offset parameter. When the over-the-air controller 410 instructs radio transceiver 405 to extract information from the memory buffer 411 for the base transmit time slot 610b, the slot offset parameter is applied such that the information is extracted from the proper location (i.e., proper memory segment 429) in the memory buffer 411. In this manner, no modifications are necessary for the backhaul line controller 412 (with the possible exception of a timing adjustment to account for the increase in delay between the forward and reverse link information).

Alternatively, the modification to memory management can be made to the backhaul line controller 412 instead of the over-the-air controller 410. In this alternative embodiment, the backhaul line controller 412 is modified so that it stores information received from the network to be transmitted to a particular user station 102 in the appropriate memory segment 429 of the memory buffer 411. For example, the backhaul line controller 412 would store information received from the network not in the memory segment 429 for the immediately following base time slot 610b but for the base time slot 610b occurring eight time slots 603 later. The over-the-air controller 410 would then cause the radio transceiver 405 to transmit the information in the correct base transmit time slot 610b. However, the over-the-air controller 410 would still need to be modified to associate the proper user transmit time slot 611a and base transmit time slot 610a pair as a single duplex channel, so that it knows when to instruct the radio transceiver 405 to transmit (or receive) and when it should remain dormant because no user station 102 is assigned to a particular time slot 605 or 606.

While according to the frame structure of FIG. 7 the user transmission and a base transmission are separated by a period equal to roughly half a time frame (i.e., eight time slots) in duration, thereby allowing the user station 102 multiple time slots to switch between the transmit and receive frequencies, the same principle of operation can be extended or applied to other similar frame structures, by selecting a different number of time slots for separating the user transmissions and corresponding base transmissions, and/or a different number of time slots in the time frame A benefit of the frame structure 601 shown in FIG. 7 is that the user stations 102 should have more than adequate time to switch between their reception and transmission frequencies of the forward link and reverse link. The backhaul line controller 912 of the base station 901 may, however, need to be modified to adjust for delays introduced by the separation of the forward link and reverse link transmissions over a TDD time frame structure, but such modifications are relatively minor in scope, and there should be no need to adjust the backhaul protocol or bandwidth (as would generally be necessary to support "true FDD" having twice the user capacity).

In addition to hardware/software changes at the base station 104 and/or user stations 102, some modifications may need to be made to the applicable communication protocol in order to support the FDD frame structures of FIGS. 5A/5B or 7. For example, if the TDD base station to be converted to FDD communication supports aggregation of time slots to a single user station 102, and such a capability is desired in the FDD communication system, then the over-the-air controller 910 may need to be modified to assign and manage multiple time slots to single user stations 102. Assuming an allocated transmit/receive frequency switching time for a given user station 102 of one time slot, the number of aggregated time slots possible in the FDD frame structures of FIGS. 5A/5B and 7 depends primarily upon the offset between the transmit and receive slots for the user stations 102. In both cases, however, approximately one half of the time slots may be assigned to a single user station 102.

It should be noted that, in various embodiments as described herein, certain circuitry is described as generally analog in nature and other circuitry is described as generally digital in nature. However, those skilled in the art will appreciate that many of the various components may be embodied in either digital or analog form, depending on a variety of recognized tradeoffs, and the present invention is not intended to be restricted to the constitution specifically described with respect to the various embodiments. For example, while the handset 801 depicted in FIG. 8 is shown having a vocoder 835 that operates on signals in the analog domain, the vocoder 835 may also be implemented in the digital domain, and the A/D converter 831 and D/A converter 832 would then be connected between the vocoder 835 and the speaker/microphone 836.

The principles of the present invention are applicable to both mobile and fixed systems, and the embodiments disclosed herein may be deployed in a mobile communication environment or a fixed wireless local-loop system. The invention may also operate in conjunction with or in accordance with or addition to features and techniques described in copending U.S. patent application Ser. No. 09/159,714 (attorney docket 227/140) and/or Ser. No. 09/159,734 (attorney docket 227/175), each of which is assigned to the assignee of the present invention and is filed concurrently herewith, and each of which is incorporated by reference as if set forth fully herein.

In a preferred embodiment, the base station 104 and user stations 102 communicate using spread spectrum communication. Each of the embodiments previously described can be configured to operate using spread spectrum communication. Suitable spread spectrum transmission and reception techniques are described, for example, in U.S. Pat. Nos. 5,016,255, 5,022047 or 5,659,574, each of which is assigned to the assignee of the present invention, and each of which is hereby incorporated as if fully set forth herein. Different cells 103 (see FIG. 1) may be assigned different spread spectrum codes (or different sets of spread spectrum codes, from which individual codes may be temporarily assigned to individual user stations 102), thereby obtaining benefits of CDMA techniques. In addition to using CDMA to distinguish transmissions in different cells 103, different frequencies may also be assigned to different cells 103, in the same or a different repeating pattern than CDMA codes are assigned.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A system for FDD communication, comprising:
   a base station, said base station generating a time frame comprising a plurality of time slots, each time slot comprising a first time segment and a second time segment;
   a plurality of user stations, wherein said user stations transmit to said base station over a first frequency band only in the first time segment of said time slots, and said base station transmits to said user stations over a second frequency band only in the second time segment of said time slots, said first frequency band distinct from said second frequency band; and
   a plurality of duplex channels each duplex channel defined by one of said first time segments with respect to said second frequency band and one of said second time segments with respect to said first frequency band, wherein, for each duplex channel, the time slot containing the first time segment of the duplex channel is separated by about one half of said time frame from the time slot containing the second time segment of the duplex channel.

2. A method for FDD communication, comprising the steps of:
   (a) generating a time frame at a base station said time frame comprising a plurality of time slots each divided into a first time segment and a second time segment;
   (b) transmitting over a first frequency band, from the base station to user stations during only the second time segment of each time slot;
   (c) transmitting, over a second frequency band distinct from the first frequency band, from the user stations to the base station during only the first time segment of each time slot; and
   (d) assigning duplex communication channels to the user stations with relation to said time frame, wherein each duplex communication channel comprises a first time segment from a first time slot and a second time segment from a second time slot, said first time slot and said second time slot being separated by approximately one half duration of said time frame.

3. A method for FDD communication, comprising the steps of:
   (a) generating a repeating time frame at a base station, said time frame comprising a plurality of time slots each divided into a first time segment and a second time segment;
   (b) receiving from a user station, over a designated user transmit frequency, a user-to-base message at said base station during a first time segment of a first one of said time slots;
   (c) switching a radio transceiver of said user station to a designated base transmit frequency;
   (d) transmitting from said base station, over the designated base transmit frequency, a base-to-user message to said user station during a second time segment of a second one of said time slots;
   (e) switching said radio transceiver of said user station to the designated user transmit frequency; and
   (f) repeating steps (b) through (e) for a plurality of user stations communicating with said base station over a plurality of time slots of said time frame.

4. The method of claim 3, wherein said second one of said time slots is time-adjacent to said first one of said time slots.

5. The method of claim 3, wherein said second one of said time slots immediately follows said first one of said time slots.

6. The method of claim 3, wherein said second one of said time slots is separated in time by approximately one half of said time frame from said first one of said time slots.

7. A user station, comprising:

a transceiver having only a single frequency synthesizer;

a controller connected to said transceiver and programmed to operate according to a time frame comprising a plurality of time slots, each time slot comprising a first time segment and a second time segment; and wherein said controller causes said transceiver to transmit a user-to-base message over a first frequency band in the first time segment of a first one of said time slots, and to receive a base-to-user message over a second frequency band in the second time segment of a second one of said time slots, said first time slot and said second time slot being separated by approximately one half duration of the time frame.

8. A base station, comprising:

a radio transceiver;

a controller connected to said radio transceiver and programmed to operate according to a time frame comprising a plurality of time slots, each time slot comprising a first time segment and a second time segment; and wherein said controller causes said radio transceiver to receive user-to-base messages from a user station over a first frequency band in the first time segment of a first time slot, and to transmit base-to-user messages to said user station over a second frequency band in the second time segment of a second time slot separated from the first time slot by approximately one half duration of said time frame.

9. A base stations comprising:

an antenna;

a radio transceiver;

a memory buffer connected to said radio transceiver, said memory buffer partitioned into a plurality of memory segments, each memory segment corresponding to a communication channel;

a transmit/receive switch connected between said radio transceiver and said antenna, said transmit/receive switch being toggled between a transmit mode and a receive mode in response to a time slot count signal;

a backhaul interface connected to said memory buffer, said backhaul interface transmitting information from said memory buffer over a backhaul line, and receiving information over said backhaul line for storage in said memory buffer;

a controller connected to said radio transceiver and programmed to operate according to a time frame comprising a plurality of time slots, each time slot comprising a first time segment and a second time segment, said controller causing said radio transceiver to receive user-to-base messages over a first frequency band in the first time segment of said time slots and to transmit base-to-user messages over a second frequency band in the second time segment of said time slots; and wherein said controller comprises a time frame marker signal and a time slot counter, said time slot counter outputting a time slot count signal, whereby information stored in the memory segments of said memory buffer is transferred to said radio transceiver for transmission during time intervals determined according to said time slot count signal, and information received from user stations is transferred from said base station transceiver for storage in the memory segments of said memory buffer during time intervals determined according to said time slot count signal.

10. A method for adapting a TDD user station to perform FDD communication, said TDD user station originally configured to operate according to a time frame comprising a plurality of time slots, each time slot divided into a first time segment and a second time segment, comprising the steps of:

configuring a radio transceiver of the TDD user station to switch between a first frequency band and a second frequency band by reading a user transmit frequency value from a plurality of user transmit frequency values, and reading a base transmit frequency value from and a plurality of base transmit frequency values; and programming a controller of the TDD user station to initiate transmission by said radio transceiver of a user-to-base message over said first frequency band during the first time segment of a first one of said time slots and to allow reception by said radio transceiver of a base-to-user message over said second frequency band during the second time segment of a second one of said time slots.

* * * * *